(12) United States Patent
Kumagai et al.

(10) Patent No.: US 10,473,453 B2
(45) Date of Patent: Nov. 12, 2019

(54) OPERATING DEVICE, OPERATING METHOD, AND PROGRAM THEREFOR

(71) Applicant: KABUSHIKI KAISHA TOPCON, Itabashi-ku (JP)

(72) Inventors: Kaoru Kumagai, Itabashi-ku (JP); Kunihiro Hayashi, Itabachi-ku (JP); Naoto Kasori, Itabachi-ku (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 475 days.

(21) Appl. No.: 14/859,900

(22) Filed: Sep. 21, 2015

(65) Prior Publication Data

US 2016/0091297 A1    Mar. 31, 2016

(30) Foreign Application Priority Data

Sep. 26, 2014 (JP) ................. 2014-196549

(51) Int. Cl.
*G01B 11/02* (2006.01)
*G01B 11/00* (2006.01)
*G01C 11/02* (2006.01)

(52) U.S. Cl.
CPC .............. *G01B 11/00* (2013.01); *G01C 11/02* (2013.01)

(58) Field of Classification Search
CPC ........................................... G01C 11/02
USPC .......................................................... 702/150
See application file for complete search history.

(56) References Cited

U.S. PATENT DOCUMENTS

| 2011/0298893 | A1* | 12/2011 | Matsumoto | G01J 3/02 348/46 |
| 2013/0076862 | A1* | 3/2013 | Ohtomo | G01C 11/025 348/46 |
| 2013/0236107 | A1* | 9/2013 | Fukaya | G06K 9/46 382/201 |

FOREIGN PATENT DOCUMENTS

| JP | 2012-185002 | 9/2012 |
| JP | 2013-040886 | 2/2013 |
| JP | 2013-72772 A | 4/2013 |
| JP | 2013-186816 | 9/2013 |
| JP | 2014-095565 | 5/2014 |

OTHER PUBLICATIONS

Office Action dated Aug. 9, 2018 in Japanese Patent Application No. 2014-195549, (with English translation), 6 pages.

\* cited by examiner

*Primary Examiner* — Moazzam Hossain
*Assistant Examiner* — Omar F Mojaddedi
(74) *Attorney, Agent, or Firm* — Xsensus LLP

(57) ABSTRACT

A position at which evaluation of a defect was performed is easily identified. Relative positional relationships between three-dimensional coordinates of feature points of a photographed object and positions of a panoramic camera 111 are calculated based on a moving image, which is photographed by the panoramic camera 111 while a vehicle 100 travels. The position of the object photographed by a hyperspectral camera 114 is calculated based on the relative positional relationships and exterior orientation parameters of the hyperspectral camera 114 with respect to the panoramic camera 111.

2 Claims, 6 Drawing Sheets

——— Forward intersection
- - - - - - Backward intersection

OPERATING DEVICE, OPERATING METHOD, AND PROGRAM THEREFOR

BACKGROUND OF THE INVENTION

Technical Field

The present invention relates to an operating device using image information and to an operating method and a program therefor.

Background Art

Techniques for obtaining spatial information for maps and the like are publicly known, as disclosed in, for example, Japanese Unexamined Patent Application Laid-Open No. 2013-40886. In this technique, while a vehicle, which is equipped with an IMU (Inertial Measurement Unit) and optical devices such as a camera and a laser scanner, travels, the location of the vehicle is measured by the IMU, and the surrounding conditions of the vehicle are simultaneously measured by the optical device. Also, techniques for performing evaluation of deterioration of concrete by optical measurement are publicly known, as disclosed in, for example, Japanese Unexamined Patent Applications Laid-Open Nos. 2012-185002 and 2014-95565.

SUMMARY OF THE INVENTION

In the technique for performing the deterioration evaluation of concrete by optical measurement, the portion evaluated as having a defect may be difficult to identify. In view of these circumstances, an object of the present invention is to provide a technique for easily identifying the location at which defect evaluation was performed.

A first aspect of the present invention provides an operating device including a relative positional relationship calculator and a measured position calculator. The relative positional relationship calculator calculates relative positional relationships between plural positions on an object to be measured, which are obtained by an optical device, and a traveled route of the optical device. The measured position calculator calculates a position on the object, which is measured by a measuring device, based on the result of the calculation performed by the relative positional relationship calculator. The measuring device has exterior orientation parameters with respect to the optical device, which are preliminarily determined, and is capable of measuring information relating to at least one of physical characteristics and temperature of the object, which differs from the information measured by the optical device.

As the optical device, a camera capable of photographing moving images or a laser scanner capable of obtaining three-dimensional point cloud position data may be mentioned. As the measuring device, a hyperspectral camera or a thermographic camera may be mentioned. A measuring device capable of measuring information relating to at least one of physical characteristics and temperature of the object, which cannot be obtained by the optical device, is used as the measuring device. In the present invention, information relating to a positional relationship between three-dimensional coordinates of the object and the optical device is obtained from the optical device. Then, by linking this information relating to the positional relationship and the positon and the attitude of the measuring device, positional information of the object measured by the measuring device is obtained.

According to a second aspect of the present invention, in the first aspect of the present invention, the position on the object measured by the measuring device may be calculated based on position and attitude of the measuring device with respect to the optical device, position of the optical device at the time when the measuring device has measured, and relative positional relationships between the plural positions on the object and the position of the optical device at the time.

A third aspect of the present invention provides an operating method including calculating relative positional relationships between plural positions on an object to be measured, which are obtained by an optical device, and a traveled route of the optical device. The operating method also includes calculating a position of the object, which is measured by a measuring device, based on the result of the calculation of the relative positional relationships. The measuring device has exterior orientation parameters with respect to the optical device, which are preliminarily determined, and is capable of measuring information relating to at least one of physical characteristics and temperature of the object, which differs from the information measured by the optical device.

A fourth aspect of the present invention provides a recording medium in which a program read and executed by a computer is stored, the program allowing the computer to calculate relative positional relationships between plural positions on an object to be measured, which are obtained by an optical device, and a traveled route of the optical device. The program also allows the computer to calculate a position of the object, which is measured by a measuring device, based on the result of the calculation of the relative positional relationships. The measuring device has exterior orientation parameters with respect to the optical device, which are preliminarily determined, and is capable of measuring information relating to at least one of physical characteristics and temperature of the object, which differs from the information measured by the optical device.

According to the present invention, the position at which defect evaluation was performed is easily identified.

PREFERRED EMBODIMENTS OF THE INVENTION

1. First Embodiment

Structure

Figure 1:
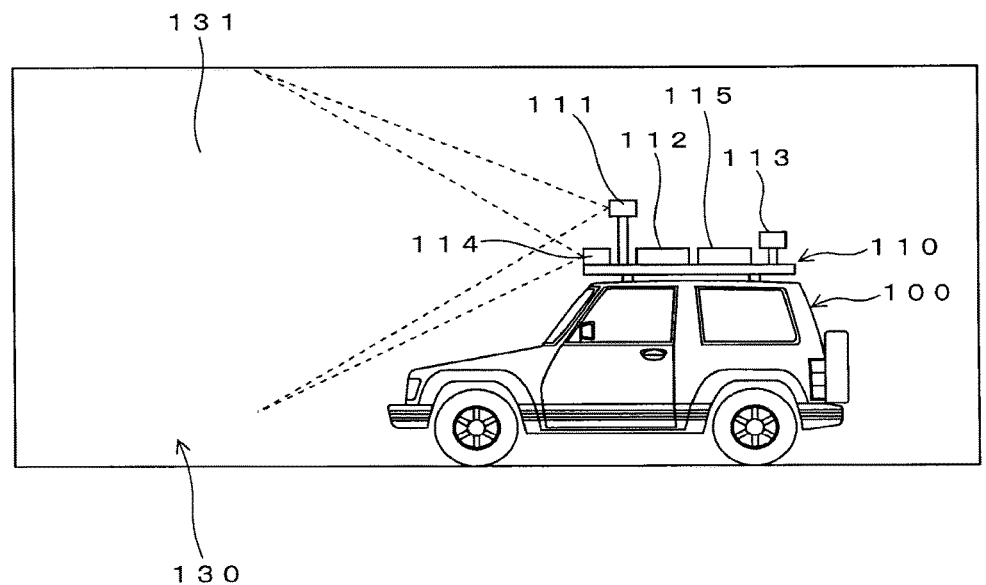
FIG. 1 is a conceptual diagram of an embodiment.
Figure 2:
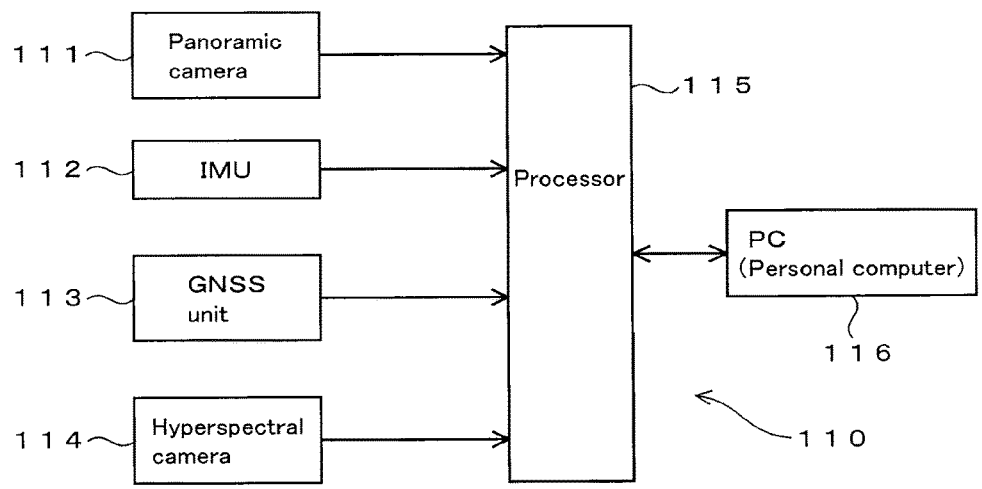
FIG. 2 is a block diagram of an embodiment.

FIG. 1 shows a conceptual diagram of an embodiment. FIG. 1 shows a vehicle 100 mounted with a measuring system 110. The measuring system 110 has a base on which a panoramic camera 111, an IMU 112, a GNSS unit 113, a hyperspectral camera 114, and a processor 115 are mounted.

The panoramic camera 111 photographs moving images of conditions in 360 degrees and of upper conditions. A camera that can photograph conditions in a particular range may be used instead of the panoramic camera 111. The IMU 112 is an inertial measurement unit and detects acceleration applied thereto. According to the information of the acceleration applied to and measured by the IMU 112, change in the attitude of the IMU 112 can be calculated. Then, by calculating change in the attitude of the IMU 112, change in the attitude of each of the vehicle 100, the panoramic camera 111, and the hyperspectral camera 114 can be known. The GNSS unit 113 receives navigation signals from a navigation satellite forming a GNSS (Global Navigation Satellite System) and outputs its location information and time information, which is calibrated and has high precision. The panoramic camera 111, the IMU 112, and the hyperspectral camera 114 operate synchronously based on a synchronizing signal provided from the GNSS unit 113. Alternatively, a circuit for generating a synchronizing signal may be prepared, and the panoramic camera 111, the IMU 112, and the hyperspectral camera 114 can be synchronously operated based on the synchronizing signal provided from the circuit.

The hyperspectral camera 114 is a camera capable of obtaining moving image information in a large number of wavelength bands, such as in several tens or more of wavelength bands. For example, whereas an ordinary color camera can obtain image information in the three wavelength bands RGB, the hyperspectral camera 114 can obtain image information in several tens of wavelength bands. By analyzing the information obtained by the hyperspectral camera 114, information relating to physical characteristics and temperature of a photographed object can be obtained.

Materials have specific light reflecting characteristics and specific light absorbing characteristics, respectively. Therefore, by analyzing a hyperspectral image photographed by the hyperspectral camera, information relating to material of the photographed object can be obtained. In addition, for example, by analyzing information in an infrared wavelength band, temperature of the photographed object and distribution thereof can be known. Specifically, for example, when there is a crack or a deteriorated portion on an inner wall of a tunnel constructed of concrete, the crack or the deteriorated portion reflects or radiates light in from an ultraviolet wavelength band to an infrared wavelength band, in which the spectrum distribution differs from that of other normal portions due to effects of material deterioration and water leakage. By utilizing this function, presence of defects on an inner wall of a concrete tunnel can be detected.

The exterior orientation parameters (position and attitude) with respect to the vehicle 100 of the panoramic camera 111, the IMU 112, the GNSS unit 113, and the hyperspectral camera 114 are preliminarily obtained and are already known. Naturally, the exterior orientation parameters of the hyperspectral camera 114 with respect to the panoramic camera 111 are preliminarily determined. This information is stored in the processor 115.

The processor 115 can be connected with a PC (personal computer) 116. By using the PC 116, various controls are performed by a user. In addition, a user can view images photographed by the panoramic camera 111 and the hyperspectral camera 114 on a display of the PC 116. It should be noted that the PC 116 can be made to perform at least a part of the processing that is to be performed by the processor 115.

Figure 3:
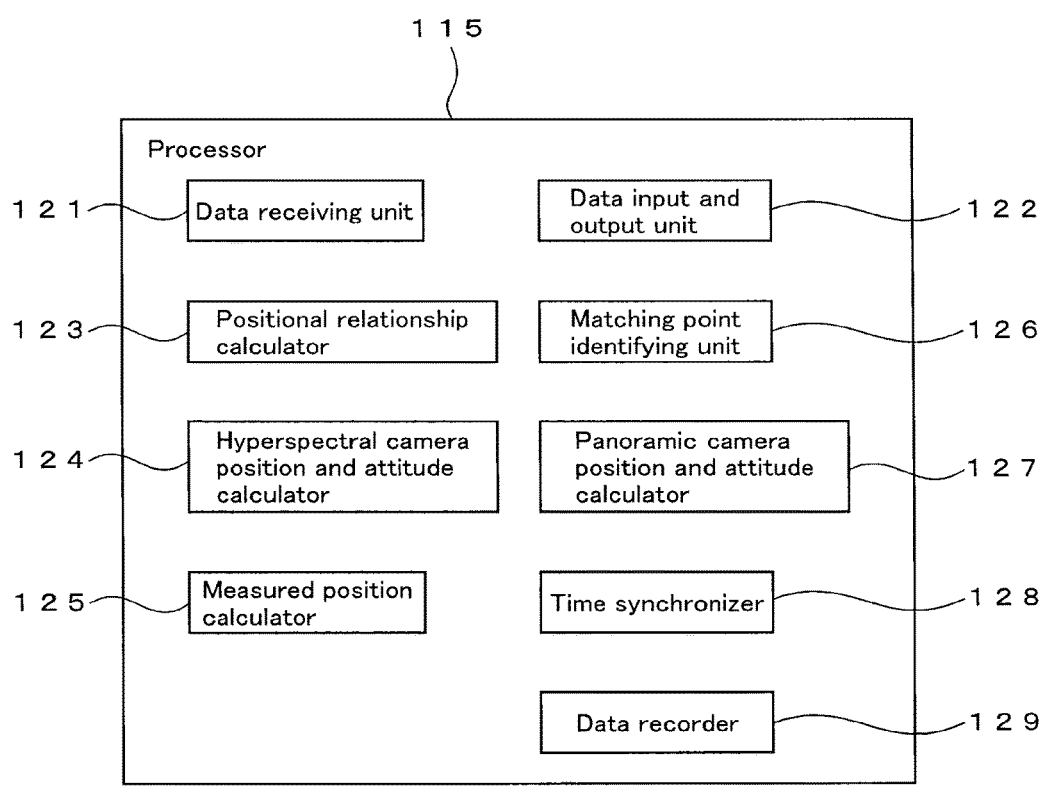
FIG. 3 is a block diagram of a processor.

The processor 115 is hardware that functions as a computer. As shown in FIG. 3, the processor 115 includes a data receiving unit 121, a data input and output unit 122, a positional relationship calculator 123, a hyperspectral camera position and attitude calculator 124, a measured position calculator 125, a matching point identifying unit 126, a panoramic camera position and attitude calculator 127, a time synchronizer 128, and a data recorder 129. Each of the functioning units may be constructed of software, or one or more of the functioning units may be constructed of dedicated hardware. Moreover, each of the functioning units shown in FIG. 3 may be constructed of a dedicated operational circuit. The functioning unit constructed of software and the functioning unit constructed of a dedicated operational circuit may be used together. For example, each of the functioning units shown in FIG. 3 can be formed of an electronic circuit such as a CPU (Central Processing Unit), an ASIC (Application Specific Integrated Circuit), a PLD (Programmable Logic Device) such as an FPGA (Field Programmable Gate Array), or the like.

Whether each of the functioning units is constructed of dedicated hardware or is constructed of software that is executed by a program in a CPU is selected in consideration of required processing speed, production cost, amount of electric power consumed, etc. For example, when a particular functioning unit is constructed of an FPGA, the processing speed is superior, but the production cost is high. On the other hand, when a particular functioning unit is constructed of software executed by a program in a CPU, materials for hardware are conserved, whereby the production cost is improved. However, in such cases of executing the function of the functioning unit by the CPU, the processing speed is inferior when compared with that in cases of using dedicated hardware. In addition, when the function of the functioning unit is executed by the CPU, there may be cases in which complicated calculations cannot be performed. The type of the functioning unit constructed of dedicated hardware and the type of the functioning unit constructed of software have the above differences, but these are equivalent in capability of performing a specific function.

The data receiving unit 121 receives data of an entire circumferential image photographed by the panoramic camera 111, data relating to acceleration from the IMU 112, data relating to location information and time information from the GNSS unit 113, and data of a hyperspectral image photographed by the hyperspectral camera 114. The time synchronizer 128 records time when each unit obtained the information. The data recorder 129 records values of each unit and the obtained time. The data input and output unit 122 exchanges data with the PC 116 and the other devices. The positional relationship calculator 123 calculates positional relationships between plural feature points of the object photographed by the panoramic camera 111 and a traveled route of the panoramic camera 111. The function of the positional relationship calculator 123 will be described hereinafter.

Figure 4:
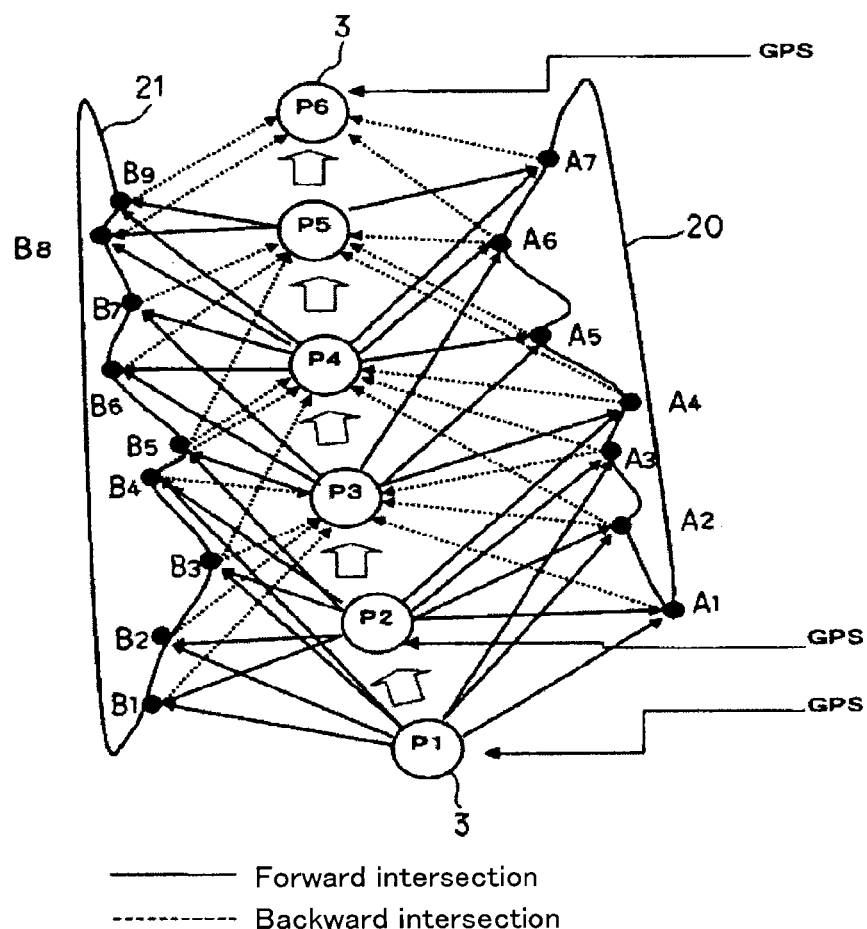
FIG. 4 is a conceptual diagram showing a principle for calculating relative positions.

FIG. 4 shows positional relationships between the position of the panoramic camera 111 and feature points of the object photographed by the panoramic camera 111. FIG. 4 shows a case in which objects 20 and 21 were photographed while the panoramic camera 111 moved from a position P1 to a position P6. Here, the feature points A1 to A7 and B1 to B9 are feature points of the objects.

First, the feature points A1 to A3 and B1 to B4 are extracted from an image photographed at the position P1. As the feature points, points that can be differentiated from surroundings, for example, edge portions and portions having colors that are different from surroundings, are extracted. The extraction of the feature points is performed by software processing using a differential filter such as a Sobel filter, a Laplacian filter, a Prewitt filter, a Roberts filter, or the like.

Moreover, the feature points A1 to A4 and B1 to B5 are extracted from an image photographed at the position P2. Identifying (tracking) of the matching relationship between the feature points that are obtained at different viewpoints is performed by the matching point identifying unit 126 by software processing. For example, the matching relationship may be identified by template matching.

Figure 5:
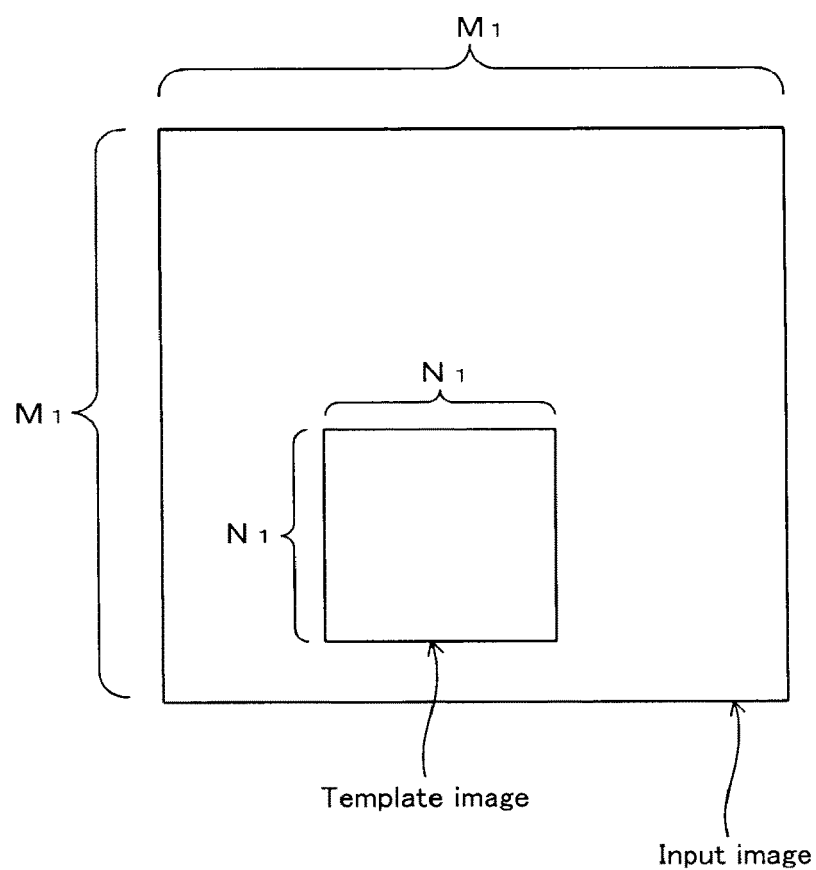
FIG. 5 is an explanatory diagram showing a principle of template matching.

As the template matching, a SSDA method (Sequential Similarity Detection Algorithm), a cross-correlation coefficient method, or the like is used. An example of the template matching will be described below. The template matching is a method in which coordinate data of images in two coordinate systems are compared with each other and a matching relationship between the two images is calculated by correlation relationship between the coordinate data. In the template matching, the matching relationship between feature points of two images seen from different viewpoints is calculated. FIG. 5 is an explanatory diagram for explaining the principle of the template matching. In this method, as shown in FIG. 5, a template image of $N_1 \times N_1$ pixels is moved on a searching range $(M_1-N_1+1)^2$ within an input image of $M_1 \times M_1$ pixels which is larger than the template image, and an upper left position of the template image is calculated so that the cross-correlation function C(a, b) denoted by the following First Formula represents the maximum value (that is, the correlation degree becomes maximum).

First Formula
$$C(a, b) = \sum_{m_1=0}^{N_1-1} \sum_{n_1=0}^{N_1-1} \frac{\{I_{(a,b)}(m_1, n_1) - \bar{I}\}\{T(m_1, n_1) - \bar{T}\}}{\sqrt{I_{\sigma ab} T_\sigma}}$$

Here, $$\bar{I} = \frac{1}{N_1^2} \sum_{m_1=0}^{N_1-1} \sum_{n_1=0}^{N_1-1} I_{(a,b)}(m_1, n_1)$$

$$\bar{T} = \frac{1}{N_1^2} \sum_{m_1=0}^{N_1-1} \sum_{n_1=0}^{N_1-1} T(m_1, n_1)$$

$$I_{\sigma ab} = \frac{1}{N_1^2} \sum_{m_1=0}^{N_1-1} \sum_{n_1=0}^{N_1-1} \{I_{(a,b)}(m_1, n_1) - \bar{T}\}^2$$

$$T_\sigma = \frac{1}{N_1^2} \sum_{m_1=0}^{N_1-1} \sum_{n_1=0}^{N_1-1} \{T(m_1, n_1) - \bar{T}\}^2$$

$I_{(a,b)}(m_1, n_1)$: Local image of input image $T(m_1, n_1)$: Template image

The above processing is performed by changing the magnification of the one image and rotating the one image. In a condition in which the correlation degree is the maximum, the matched region of both images is calculated, and feature points in this region are extracted, whereby matching points are detected.

By using the template matching, a portion that matches between compared two images can be identified, and the matching relationship between the two images can be calculated. In this method, the relative positional relationship between the two images is calculated so that the degree of the correlation relationship between the two images is the maximum. The correlation relationship between the two images is calculated based on the feature points of the two images.

Figure 6:
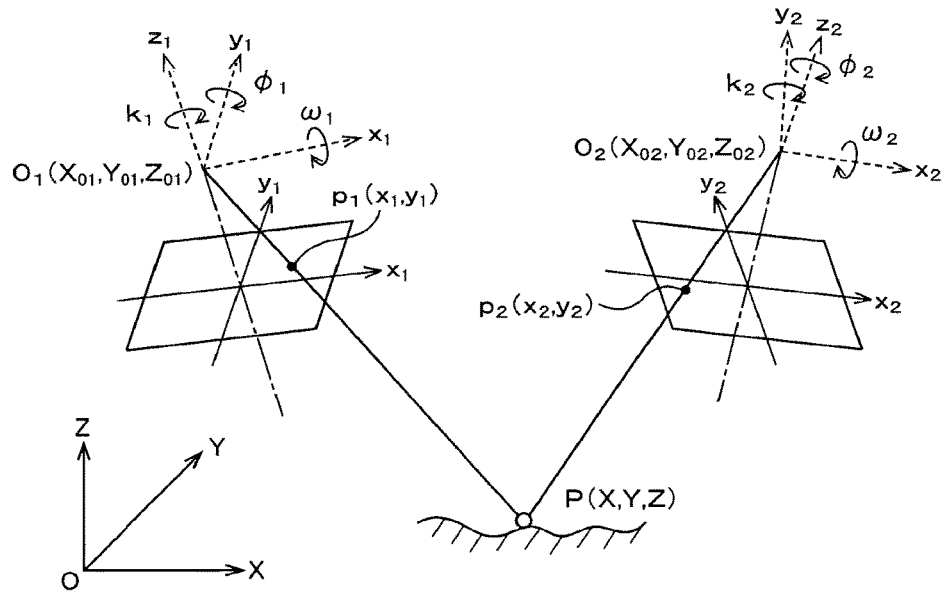
FIG. 6 is an explanatory diagram showing a principle of a forward intersection method.

After the matching relationships of the feature points obtained at the positions P1 and P2 are calculated, relative positional relationships between the positions P1 and P2 and the feature points A1 to A4 and B1 to B5 are calculated by using an intersection method. FIG. 6 shows a principle of a forward intersection method. The forward intersection method is a method of observing directions from plural known points (in the case shown in FIG. 6, two points ($O_1$, $O_2$)) to an unknown point P and calculating the position of the unknown point P as the intersection point of these directional lines.

Figure 7:
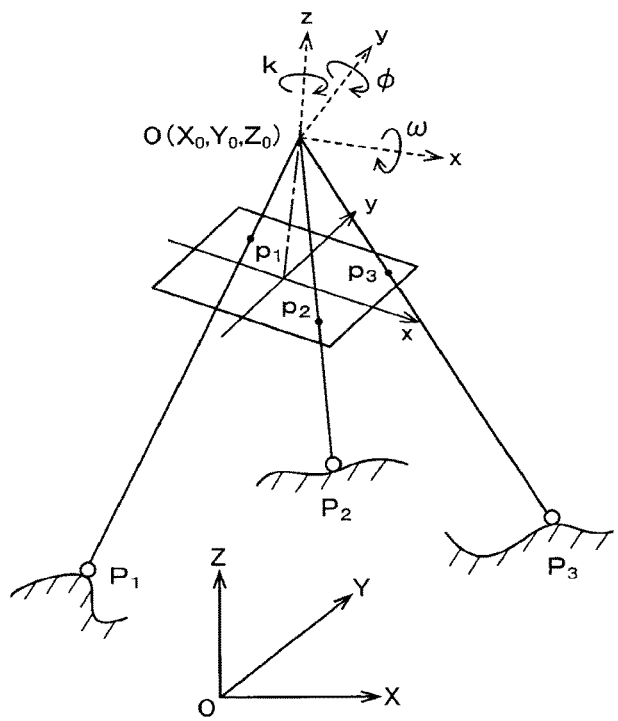
FIG. 7 is an explanatory diagram showing a principle of a backward intersection method.

FIG. 7 shows a principle of a backward intersection method. The backward intersection method is a method of observing directions from an unknown point to at least three known points and calculating the position of the unknown point as the intersection point of these directional lines. As the backward intersection method, a single photo orientation or a DLT method (Direct Linear Transformation Method) may be used. The details of the intersection method may be found in "Technology of Positioning Solutions" (published by DENKISHOIN on April, 2010) on pages 182 and 184. In addition, a specific example of the calculation method is disclosed in Japanese Unexamined Patent Application Laid-Open No. 2013-186816.

In principle, a directional line from the position P1 to each of the feature points A1 and A2 is set, and moreover, a directional line from the position P2 to each of the feature points A1 to A4 is set, whereby relative positional relationships between the positions P1 and P2 and the feature points A1 to A4 are calculated. Moreover, by setting a directional line from each of the feature points A1 to A4 to the position P3, relative positional relationships between the position P3 and the feature points A1 to A4 are calculated. Then, since the relative positional relationships between the feature points A1 to A4 and the position P2 are already calculated, relative positional relationships between the positions P1 to P3 and the feature points A1 to A4 are calculated. According to this principle, relative positional relationships between the positions P1 to P6 and the feature points A1 to A7 or B1 to B9 are calculated. The calculation of the relative positional relationships using the intersection method is performed by the positional relationship calculator 123. It should be noted that when absolute coordinate values of two or more points among the positions P1 to P6 and the feature points A1 to A7 and B1 to B9 or a distance between two particular points is not obtained, the scale of the model shown in FIG. 4 cannot be identified, and an absolute value of a distance between each point cannot be calculated.

Moreover, at this stage, the attitude of the panoramic camera 111 at the position P2 with respect to the attitude of the panoramic camera 111 at the position P1 is calculated. That is, by setting the model as exemplified in FIG. 4, a relative relationship between the direction of a particular feature point viewed from the position P1 and the direction of the particular feature point viewed from the position P2 is calculated. Therefore, the relative relationship between the attitude of the panoramic camera 111 at the position P1 and the attitude of the panoramic camera 111 at the position P2 is calculated. According to this principle, the change in the attitude of the panoramic camera 111 through each position is calculated based on plural common feature points in the images. Thus, the relative relationships between the attitudes of the panoramic camera 111 at the positions P1 to P6 are obtained.

The above processing for calculating the relative positional relationships between the positions P1 to P6 and the feature points A1 to A7 and B1 to B9 and the relative relationships between the attitudes of the panoramic camera 111 at the positions P1 to P6 is performed by the positional relationship calculator 123. In the case shown in FIG. 4, the absolute positions of the positions P1, P2, and P6 are identified by a GPS. Accordingly, by substituting the coordinates of the absolute positions obtained by the GPS into the coordinates of the positions P1, P2, and P6 in the relative positional relationships, coordinate values of the positions P1 to P6 and the feature points A1 to A7 and B1 to B9 in the absolute coordinate system are obtained. Then, by obtaining the absolute coordinate values at each position, the traveled route of the panoramic camera 111 that has moved from the position P1 to P6 is identified. Thus, the position and the attitude of the panoramic camera 111 in the absolute coordinate system at each time are calculated. This processing is performed by the panoramic camera position and attitude calculator 127.

The hyperspectral camera position and attitude calculator 124 calculates the position and the attitude of the hyperspectral camera 114 in the absolute coordinate system at each time, from the data relating to the position and the attitude of the panoramic camera 111 calculated by the panoramic camera position and attitude calculator 127 and from the exterior orientation parameters of the hyperspectral camera 114 with respect to the panoramic camera 111.

The measured position calculator 125 calculates the position of the object in the area photographed by the hyperspectral camera 114 from the position and the attitude of the hyperspectral camera 114 in the absolute coordinate system at each time.

For example, a case of identifying the position of an object photographed in a particular frame image of a hyperspectral image obtained by the hyperspectral camera 114 is assumed. In this case, first, the time t when the frame image of the hyperspectral image was taken is obtained. It should be noted that the frame image is a unit image forming a moving image. The moving image is formed of frame images that are consecutively photographed in a particular time interval. This is the same as in the moving image photographed by the panoramic camera 111 and also in the moving image photographed by the hyperspectral camera 114.

After the time t is identified, a frame image of an entire circumferential image (image photographed by the panoramic camera 111) at the time t is obtained. The exterior orientation parameters of the hyperspectral camera 114 with respect to the panoramic camera 111 are already known. Therefore, the position of the area the hyperspectral camera 114 has photographed can be identified in the entire circumferential image photographed by the panoramic camera 111. For example, such information that the hyperspectral camera 114 has photographed a visual field area containing the 90 degrees of the left side of the vehicle 100 at the center is obtained.

The three-dimensional coordinates of feature points of the photographed object in, for example, the visual field area containing the left side in 90 degrees of the vehicle 100 at the center can be known from the results of the calculation performed by the positional relationship calculator 123. Therefore, by using the three-dimensional coordinates of a feature point of the photographed object in the visual field area as coordinates of the object measured by the hyperspectral camera 114, positional data of the object measured at the time t by the hyperspectral camera 114 can be obtained. For example, three-dimensional coordinates of a feature point nearest to the center in the screen may be used. The processing for calculating the position of the object measured at the particular time by the hyperspectral camera 114 is performed by the measured position calculator 125.

By using the above principle, in a case in which a user selects a particular position in a frame image of a hyperspectral image at a particular time, three-dimensional coordinates of the particular position (or approximate values thereof) can be calculated. For example, in the case shown in FIG. 6, the point $O_1$ is assumed to be the viewpoint of the hyperspectral camera 114, and the point $O_2$ is assumed to be the viewpoint of the panoramic camera 111. In addition, the position $p_1$ is assumed to be the position in the screen selected by the user. In this case, if the photographed object P includes a feature point that is extracted in the entire circumferential image, three-dimensional coordinates of the object at the position corresponding to the image coordinate position $p_1$, which is selected in the hyperspectral image by a user, are calculated. If the photographed object P does not include the feature point that is extracted in the entire circumferential image, a feature point in the vicinity of the photographed object P is used as an approximate point, and three-dimensional coordinate values thereof can be used as approximate values. Moreover, in a condition in which the position of the photographed object P is identified, the position $p_2$ is also calculated, whereby image coordinate values in the entire circumferential image corresponding to a particular point in the hyperspectral image can be calculated.

By using the above function, for example, in a case in which a defect portion of an object is found in a hyperspectral image, positional information of the object at the time when the hyperspectral image was taken by the hyperspectral camera 114 is obtained. Moreover, by selecting a particular portion by a user, three-dimensional coordinates of the position of the particular portion can be known.

Example of Processing

Figure 8:
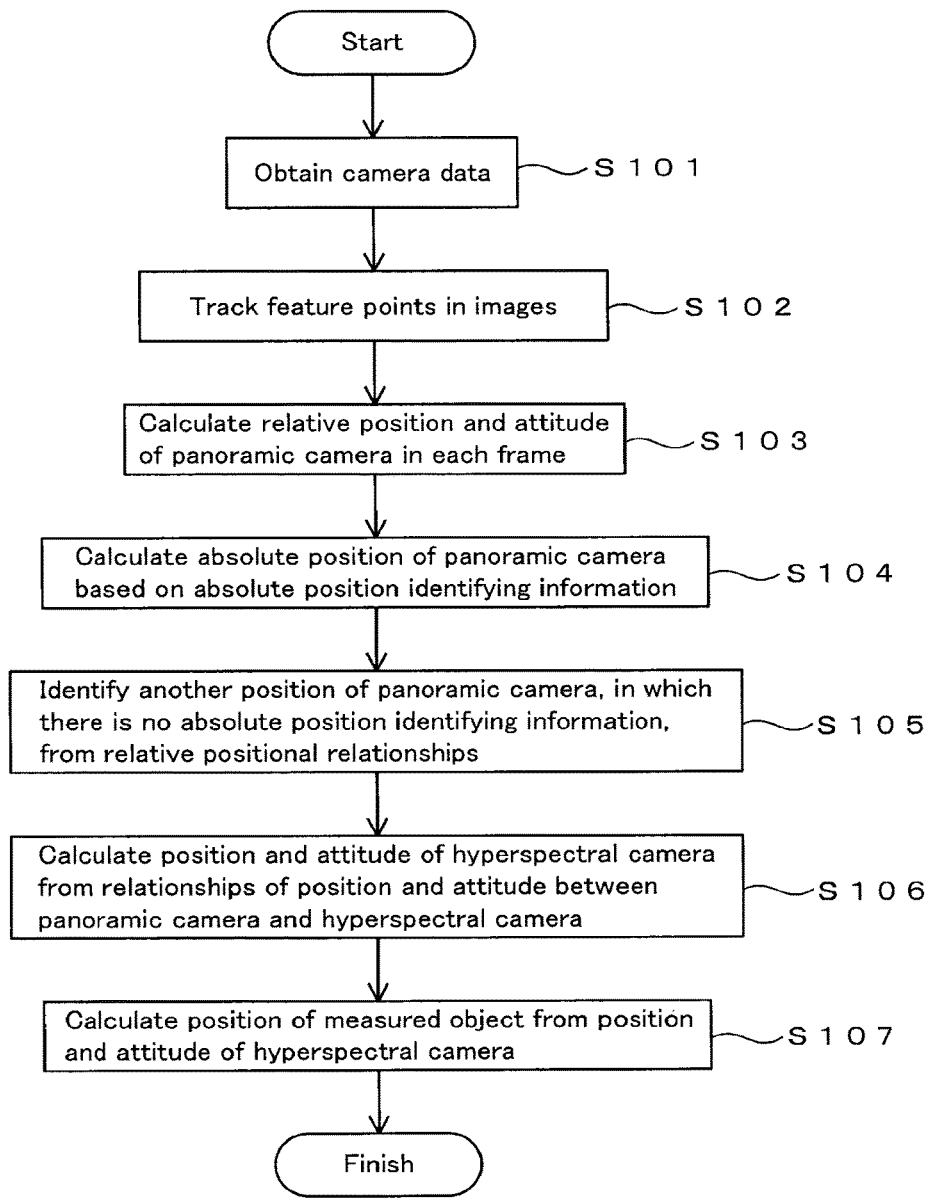
FIG. 8 is a flow chart showing an example of a procedure of processing.

FIG. 8 shows an example of a procedure of processing. Programs for executing the processing shown in FIG. 8 are stored in an appropriate storage area and are executed by the processor 115. The programs may be stored in appropriate storage media.

Here, a case of detecting a defect portion on a tunnel inner wall 131 is exemplified. The detection is performed by analyzing a hyperspectral image, which was obtained while a vehicle 100 traveled in a tunnel 130 (refer to FIG. 1) and while an entire circumferential image was also obtained.

First, traveling of the vehicle 100 is started in the tunnel 130 while the panoramic camera 111 and the hyperspectral camera 114 are operated, and data of an entire circumferential image and data of a hyperspectral image are obtained (step S101). At that time, the vehicle 100 is made to travel outside the tunnel first, and location information is obtained from the GNSS, so as to obtain absolute positions at plural positions such as the positions P1 and P2 in FIG. 4. If there is a GCP (Ground Control Point) that outputs location information in the tunnel, the location information therefrom is used, and absolute positional information of the vehicle 100 at a particular time is obtained.

In this example, the processing of steps S102 to S106 is performed while image data is obtained. It should be noted that the processing of the step S102 and the subsequent steps may be performed at a later timing after the image data is obtained. In the step S102, feature points are tracked between each frame image of the entire circumferential image, and matching relationships between the plural feature points in each frame image are identified. This processing is performed by the matching point identifying unit 126.

After the feature points are tracked, and the matching relationships between the feature points in the frame images of the entire circumferential image are identified, relative positional relationships between the plural feature points of an object to be measured and the position and the attitude of the panoramic camera 111 at each time are calculated by using the principle shown in FIG. 4. This processing is performed by the positional relationship calculator 123. Then, after the relative positional relationships between each of the feature points and the position and the attitude of the panoramic camera 111 at each time are calculated, relative position and attitude of the panoramic camera 111 in each frame (at each time) are calculated. Thus, information of the relative position and attitude of the panoramic camera 111 in each frame is obtained (step S103).

Next, a position, at which the absolute position is identified in accordance with the absolute position identifying information such as the navigation signals of the GNSS and the like, is calculated, and the coordinate values of the position are used as the position of the panoramic camera 111 at the time when the position was photographed (step S104).

Then, a position, at which the absolute position identifying information such as the navigation signals of the GNSS and the like is not obtained, is calculated based on the relative positional relationships of the panoramic camera 111 between each frame (between each time) obtained in the step S103 and based on the absolute positional data of the panoramic camera 111 at the particular time obtained in the step S104 (step S105). For example, in the case shown in FIG. 4, the absolute position of the position P3 can be calculated from the absolute position of the position P2 identified by the GPS and the relative positional relationship between the positions P2 and P3.

According to the results of the processing in the steps S104 and S105, data relating to the traveled route of the panoramic camera 111 is obtained. Moreover, the data of the traveled route is linked with the data of the attitude of the panoramic camera 111 based on the acceleration detected by the IMU 112. Thus, the position and the attitude of the panoramic camera 111 in the absolute coordinate system at each time are calculated. The processing for calculating the position and the attitude of the panoramic camera 111 at each time is performed by the panoramic camera position and attitude calculator 127.

After the position of the panoramic camera 111 at each time is obtained, the position and the attitude of the hyperspectral camera 114 in the absolute coordinate system at each time are calculated from the relationships of the position and the attitude between the panoramic camera 111 and the hyperspectral camera 114 (step S106). This processing is performed by the hyperspectral camera position and attitude calculator 124.

Then, when a particular frame in the hyperspectral image is selected, three-dimensional coordinates of a particular position of the object in the area photographed by the hyperspectral camera 114 are calculated from the entire circumferential image at the time when the particular frame was obtained (step S107). For example, a portion of the object located at the center in the hyperspectral image may be used. This processing is performed by the measured position calculator 125.

For example, a case, in which a user observes a hyperspectral image so as to examine a tunnel inner wall photographed by the hyperspectral camera 114, is assumed. At this time, it is assumed that a portion suspected of having a defect such as a crack or deterioration is found according to information of color, spectrum, etc. In this case, the user selects a frame image of the hyperspectral image in which the suspected portion was found. Then, according to the time when the frame image of the hyperspectral image was obtained, three-dimensional coordinates of feature points of the object (tunnel inner wall) photographed at the time by the panoramic camera 111 are calculated.

According to the relationships of the position and the attitude of the hyperspectral camera 114 with respect to the panoramic camera 111, the area in the entire circumferential image corresponding to the area photographed by the hyperspectral camera 114 is identified. Therefore, the user can know the positional information of the area photographed at the time by the hyperspectral camera 114. That is, the user can know information relating to the position of the inner wall suspected of having a defect within the entirety of the tunnel.

Other Matters

By using plural frame images of hyperspectral images obtained at different timings, three-dimensional coordinates of a particular position in the hyperspectral image can be calculated by the forward intersection method. In this case, the three-dimensional coordinates of the particular position in the hyperspectral image are calculated by the forward intersection method using the position of the hyperspectral camera 114 at each of the timings. Alternatively, the three-dimensional coordinates of the particular position in the hyperspectral image can also be calculated by the forward intersection method using the entire circumferential image and the hyperspectral image.

Moreover, in a case of using information in a wavelength band of infrared light detected by the hyperspectral camera 114, or a case of using a thermographic camera instead of the hyperspectral camera 114, a portion causing liquid leakage or gas leakage in a pipe can be detected. In this case, also, the position in the pipe, at which a defect was found, can be identified.

The present invention can be utilized for techniques for easily identifying information of a position at which defect evaluation was performed.

What is claimed is:

1. A method for detecting a defect on an inner wall of a concrete tunnel by using a camera, a hyperspectral camera, a Global Navigation Satellite System (GNSS) unit, and an Inertial Measurement Unit (IMU) that are mounted on a vehicle, exterior orientation parameters of the camera, the hyperspectral camera, the GNSS unit, and the IMU relative to the vehicle are known, the method comprising:
   obtaining position information of the vehicle in terms of absolute position by using the GNSS unit in a condition in which the vehicle travels outside the tunnel;
   photographing an object outside the tunnel and the inner wall of the tunnel successively by the camera and the hyperspectral camera while the vehicle travels outside the tunnel and subsequently enters and travels through the tunnel to obtain multiple frame images;
   tracking feature points in the multiple frame images to determine relative positional relationships between a position of the camera at the time of photographing of each of the multiple frame images and positions of the feature points by an intersection method;
   obtaining a three-dimensional position of each of the feature points in an absolute coordinate system in the multiple frame images, and obtaining position and attitude of the camera in the absolute coordinate system at the time of photographing of each of the multiple frame images, on a basis of the position information from the GNSS unit, measurement data from the IMU, and the relative positional relationships; and obtaining a three-dimensional position in the absolute coordinate system of the inner wall of the tunnel that is contained in a frame image selected from among the multiple frame images, on a basis of the three-dimensional position of each of the feature points in the absolute coordinate system and the position and the attitude of the camera in the absolute coordinate system.

2. A non-transitory computer recording medium storing computer executable instructions for detecting a defect on an inner wall of a concrete tunnel by using a camera, a hyperspectral camera, a Global Navigation Satellite System (GNSS) unit, and an Inertial Measurement Unit (IMU) that are mounted on a vehicle, exterior orientation parameters of the camera, the hyperspectral camera, the GNSS unit, and the IMU relative to the vehicle are known, and when executed by a computer processor, the instructions cause the computer processor to perform operations comprising:

obtaining position information of the vehicle in terms of absolute position by using the GNSS unit in a condition in which the vehicle travels outside the tunnel;

photographing an object outside the tunnel and the inner wall of the tunnel successively by the camera and the hyperspectral camera while the vehicle travels outside the tunnel and subsequently enters and travels through the tunnel, to obtain multiple frame images;

tracking feature points in the multiple frame images to determine relative positional relationships between a position of the camera at the time of photographing of each of the multiple frame images and positions of the feature points by an intersection method;

obtaining a three-dimensional position of each of the feature points in an absolute coordinate system in the multiple frame images, and obtaining position and attitude of the camera in the absolute coordinate system at the time of photographing of each of the multiple frame images, on a basis of the position information from the GNSS unit, measurement data from the IMU, and the relative positional relationships; and obtaining a three-dimensional position in the absolute coordinate system of the inner wall of the tunnel that is contained in a frame image selected from among the multiple frame images, on a basis of the three-dimensional position of each of the feature points in the absolute coordinate system and the position and the attitude of the camera in the absolute coordinate system.

* * * * *